(12) United States Patent
Feeney et al.

(10) Patent No.: US 7,946,910 B2
(45) Date of Patent: May 24, 2011

(54) SUBSTANTIALLY SIMULTANEOUS INTERMITTENT CONTEST

(75) Inventors: Robert J. Feeney, Glendale, CA (US);
Brent W. Barkley, Glendale, CA (US);
Jeff E. Haas, Glendale, CA (US);
Gregory J. Pinter, Danville, CA (US)

(73) Assignee: Vergence Entertainment LLC, Glendale, CA (US)

( * ) Notice: Subject to any disclaimer, the term of this patent is extended or adjusted under 35 U.S.C. 154(b) by 303 days.

(21) Appl. No.: 11/539,179

(22) Filed: Oct. 6, 2006

(65) Prior Publication Data
US 2007/0087833 A1 Apr. 19, 2007

Related U.S. Application Data

(60) Provisional application No. 60/724,473, filed on Oct. 6, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/9; 463/1; 463/29; 463/40; 463/42; 705/1; 379/37; 379/39; 273/460; 434/323

(58) Field of Classification Search ....................... 463/9
See application file for complete search history.

(56) References Cited

U.S. PATENT DOCUMENTS

| | | | | |
|---|---|---|---|---|
| 5,283,734 A * | 2/1994 | Von Kohorn | ................. | 463/17 |
| 5,495,470 A * | 2/1996 | Tyburski et al. | .............. | 370/248 |
| 5,916,024 A * | 6/1999 | Von Kohorn | ................. | 463/40 |
| 6,086,381 A * | 7/2000 | Downs et al. | ................. | 434/322 |
| 6,155,927 A * | 12/2000 | Levasseur et al. | .............. | 463/42 |
| 6,193,610 B1 * | 2/2001 | Junkin | .......................... | 463/40 |
| 6,267,379 B1 * | 7/2001 | Forrest et al. | ................ | 273/431 |
| 6,394,899 B1 * | 5/2002 | Walker | .............................. | 463/9 |
| 6,473,084 B1 * | 10/2002 | Phillips et al. | ............... | 345/440 |
| 6,606,615 B1 * | 8/2003 | Jennings et al. | ................ | 706/45 |
| 6,659,861 B1 * | 12/2003 | Faris et al. | ........................ | 463/1 |

(Continued)

FOREIGN PATENT DOCUMENTS
WO WO/00/68864 11/2000

OTHER PUBLICATIONS

"M7 Networks Partners with Terraplay to Deliver Real-time Multiplayer Gaming," 2004-06-0. Printout from http://old.terraplay.com/news.asp?t=8.
"3GSM visitors . . . a long list! Gaming, for example . . . " Printout from http://www.newswireless.net/index.cfm/article/1897.
"M7 Networks Enables Eudora2go(TM) From Intellisync With Its BREW(R) Application 'Wake-Up' Solution." Printout from http://www.freshnews.com/news/telecom-wireless/article_24997.html?QUALCOMM.

(Continued)

*Primary Examiner* — Paul D'Agostino
(74) *Attorney, Agent, or Firm* — Joseph G. Swan, P.C.

(57) ABSTRACT

Provided, inter alia, is a type of contest in which, at various intervals, geographically dispersed players attempt to answer the identical problem at substantially the same time. In representative embodiments, problems (typically, questions) are made available at seemingly random times throughout the day (or throughout some specified time interval), and players have the opportunity either to respond to the problem or (e.g., in the event that a given player is occupied when a particular problem arises) to pass on the current problem and wait for another one. In such embodiments, more questions are made available than the players are permitted to answer in accordance with the rules of the game, so that players have flexibility as to when they participate.

28 Claims, 5 Drawing Sheets

U.S. PATENT DOCUMENTS

| | | | |
|---|---|---|---|
| 6,688,982 B2 * | 2/2004 | Moodie et al. | 463/41 |
| 6,800,031 B2 * | 10/2004 | Di Cesare | 463/40 |
| 6,935,960 B2 | 8/2005 | Jandel et al. | |
| 7,076,434 B1 * | 7/2006 | Newnam et al. | 705/1 |
| 2002/0042293 A1 * | 4/2002 | Ubale et al. | 463/9 |
| 2002/0132656 A1 * | 9/2002 | Lydon et al. | 463/9 |
| 2002/0165024 A1 * | 11/2002 | Puskala | 463/40 |
| 2003/0064807 A1 * | 4/2003 | Walker et al. | 463/42 |
| 2003/0083118 A1 * | 5/2003 | Nelson et al. | 463/9 |
| 2003/0130021 A1 * | 7/2003 | Lydon et al. | 463/9 |
| 2004/0143495 A1 * | 7/2004 | Koenig | 705/14 |
| 2005/0020336 A1 * | 1/2005 | Cesare | 463/9 |
| 2005/0043094 A1 * | 2/2005 | Nguyen et al. | 463/42 |
| 2005/0181835 A1 * | 8/2005 | Lau et al. | 455/567 |
| 2005/0197189 A1 * | 9/2005 | Schultz | 463/42 |
| 2005/0271186 A1 * | 12/2005 | Lichorowic et al. | 379/37 |
| 2007/0061586 A1 * | 3/2007 | Golubchik et al. | 713/178 |
| 2007/0155465 A1 * | 7/2007 | Walker et al. | 463/16 |
| 2007/0259709 A1 * | 11/2007 | Kelly et al. | 463/20 |

OTHER PUBLICATIONS

Multiplayer games coming to cell phones. Printout from http://www.usatoday.com/tech/wireless/phones/2004-09-20-mobile-multis_x.htm.

"Exit Games Partners with Motricity to Seamlessly Integrate Advanced Multiplayer Gaming Functionality with Mobile Community Service." Printout from http://mobile.gamezone.com/news/03_20_06_10_05AM.htm "Starting with BREW™", Apr. 27, 2004, published by QUALCOMM Incorporated.

* cited by examiner

SUBSTANTIALLY SIMULTANEOUS INTERMITTENT CONTEST

This application claims the benefit of U.S. Provisional Patent Application Ser. No. 60/724,473, filed on Oct. 6, 2005, and titled "Real-Time Incentivized Game Platform", which application is incorporated by reference herein as though set forth herein in full.

FIELD OF THE INVENTION

The present invention pertains to a contest that is played substantially simultaneously, but at intermittent intervals, by a large number of geographically dispersed players.

BACKGROUND

A variety of different kinds of games and contests exist. However, people constantly are looking for new ways in which to compete with others.

SUMMARY OF THE INVENTION

The present invention addresses this need by providing, inter alia, an entirely new type of contest in which, at various intervals, geographically dispersed players attempt to answer the identical problem at substantially the same time. In representative embodiments, problems (typically, questions) are made available at seemingly random times throughout the day (or throughout some specified time interval), and players have the opportunity either to respond to the problem or (e.g., in the event that a given player is occupied when a particular problem arises) to pass on the current problem and wait for another one. In such embodiments, more questions are made available than the players are permitted to answer in accordance with the rules of the game, so that players have flexibility as to when they participate.

Thus, in one aspect the invention is directed to systems, methods and techniques for implementing a simultaneous, but intermittently played, contest. Initially, a problem is delivered substantially simultaneously to geographically dispersed players, the problem being identical for all players. Responses to the problem are received from the players, the corresponding response times are measured, and scores are determined for the players based on the responses and corresponding response times. The foregoing steps are then repeated a plurality of times, with a median time interval between delivery of consecutive problems being at least 30 minutes, and with an aggregate score being maintained for each of the players.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

This application is related to the commonly assigned patent application titled, "System For Substantially Simultaneous Alerts", which is being filed on the same date as this application. That application is incorporated by reference herein as though set forth herein in full.

The present disclosure is divided into sections. The first section describes certain technological considerations for implementing contests and other methods of the present invention. The second section describes an exemplary contest that may be implemented using such platforms. Subsequent sections provide additional information, as indicated by their headings.

Substantially Simultaneous Alert Technology.

Figure 1:
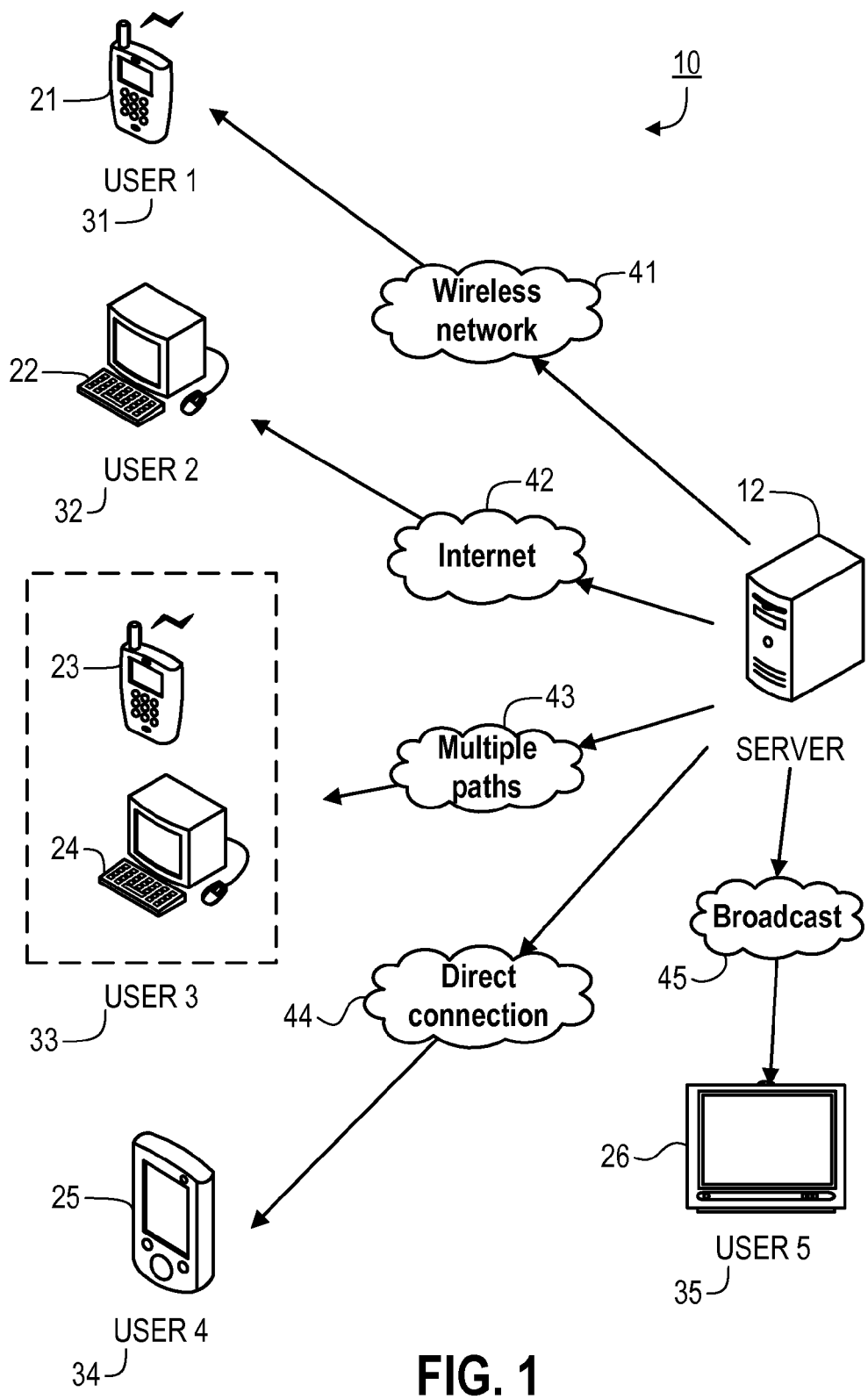
FIG. 1 illustrates an overview of an alert system according to a representative embodiment of the present invention.

Many of the techniques of the present invention require that a message be delivered substantially simultaneously to a large number of geographically dispersed (e.g., spread across different cities, states or even countries) individuals or devices. FIG. 1 illustrates an overview of an alert system 10 for achieving this goal, according to a representative embodiment of the present invention.

Generally speaking, a central server 12 drives the alert system 10, communicating with a plurality of different user devices (e.g., devices 21-26). Each such device 21-26 typically has a user associated with it (e.g., user 31 for device 21 and user 32 for device 22). In some cases, a single user (e.g., user 33) has two or more user devices (e.g., devices 23 and 24) that are registered with server 12, as discussed in more detail below.

Server 12 may be implemented as a single physical device, but more commonly will be implemented as a server cluster, with redundancy, appropriate load-sharing hardware and software, and different functionality distributed across different physical boxes, as is well known in the art. In one embodiment, different physical devices are used for communicating across different kinds of networks (e.g., directly over the Internet, by SMS messaging, or using a proprietary wireless protocol).

It is noted that although only six user devices 21-26 are illustrated in FIG. 1, this is for ease of illustration only. Typically, there will be many more user devices that participate in the alert system 10, such as more than 50, 100, 500, 1,000 or even 10,000 such devices (as well as a similar number of users). Also, the same server 12 can be used to handle multiple alert systems, e.g., using different distribution lists and different back-and processing routines for such different systems.

Each user 31-35 preferably has pre-registered with server 12 for the current alert system 10, designating the device(s) on which such user 31-35 will be receiving the alerts, as well as the manner in which server 12 is to communicate with such device. In this latter regard, the present invention contemplates multiple different modes of communication between server 12 and the various user devices 21-26.

The most commonly anticipated communication mode will involve the use of a wireless network 41, so that the corresponding user device 21 will be more likely to be able to communicate with server 12 at any time of day. However, as discussed in more detail below, the preferred embodiments of the present invention do not require real-time communication in order to function as intended.

A variety of different specific communication techniques may be implemented over a wireless network 41. For instance, messages may be sent via short messaging service (SMS), using wireless Web communications, or using any of the other wireless data protocols (whether public or proprietary) that are supported by the particular wireless carrier.

Another commonly anticipated communication mode involves direct Internet communications 42. This general mode also can be used to convey information using any of a variety of different specific protocols, such as hypertext transfer protocol (HTTP), file transfer protocol (FTP), any proprietary data-transfer protocol, or even instant messaging or e-mail messaging protocols.

As noted above, in certain cases a single user 33 will register multiple different devices 23 and 24 with server 12 for participation in a particular alert system 10. Moreover, as shown in FIG. 1, multiple different communication paths 43 may be used for the different devices 23 and 24 (e.g., a wireless network for device 23 and a direct Internet connection for device 24).

The user 33 preferably has the ability to designate multiple devices 23 and 24 as both being currently active, so that when the alert occurs it will be delivered by both devices, thereby maximizing the likelihood that the user 33 will be in the vicinity of one of such devices 23 and 24 at the appropriate time. Alternatively, the user 33 preferably also has the ability to designate only a single one of the devices 23 and 24 to deliver the message, e.g., depending on when the message is to be delivered. In such a case, the user 33 preferably defines a schedule, indicating which device 23 and 24 is active at which times. In addition, more than two devices 23 and 24 may be registered, and the user 33 preferably can designate any number as being active at a given time.

Still further, it also is possible for server 12 to communicate with a non-networked device 25 (operated by user 34), e.g., by using a direct connection 44. Examples include transferring the required data using a point-to-point cable, wireless connection (e.g., infrared or Bluetooth) or cradle. It is noted that such direct delivery 44 generally will constitute only one of the steps in the overall delivery process, such as where server 12 downloads the required information to a networked computer or other device which, in turn, directly transfers it to user device 25.

Finally, server 12 may communicate with a user device 26 via a broadcast medium (a wireless broadcast, e.g., using radio frequencies, and/or a hardwired broadcast, e.g., using television cable or Internet broadcasts). In the illustrated embodiment, the user device 26 is an interactive television, but any other kind of device instead may be used for receiving such broadcasts, including a general-purpose computer or a cellular telephone.

The specific ways described above for server 12 to communicate with the various user devices 21-26 should be understood as being exemplary only. Any other communication modes or paths instead, or in addition, may be used. Also, any combination of different paths or modes may be used.

FIG. 1 illustrates one-way communication between the server 12 and the various user devices 21-26. However, in certain preferred embodiments of the invention, communication is bidirectional between server 12 and user devices 21-26.

Figure 2:
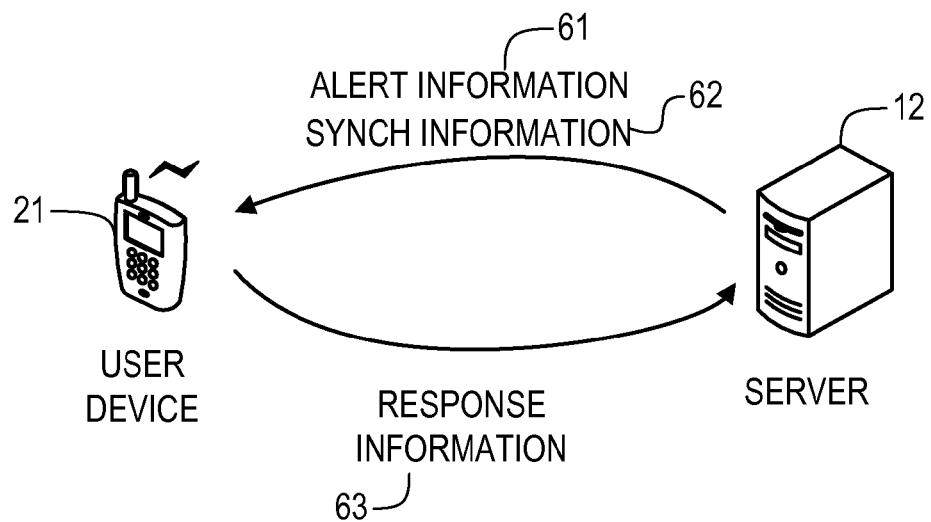
FIG. 2 illustrates communication between a user device and a server according to a representative embodiment of the present invention.

This is illustrated in FIG. 2, which shows an exemplary user device 21 in communication with server 12. As discussed in more detail below, in such embodiments server 12 typically communicates alert information 61 and time synchronization information 62 to user device 21, and user device 21 typically communicates a response 63 to such alert information 61 back to server 12. According to the preferred embodiments of the invention, such communications can occur over significant time intervals and often will vary significantly from one user device 21 to another of the user devices 22-26. Such variations often will be common even where all of the user devices 21-26 are delivering the message 61 at substantially the same time and allowing the corresponding users 31-35 to submit their responses 63 at substantially the same times. More specifically, in the preferred embodiments the alert information 61 may be stored on user device 21 at any time prior to the scheduled delivery and the response may be transmitted back to server 12 at any time after it has been submitted by the corresponding user 31. In addition, the various types of information may be transmitted using different communication channels.

Figure 3:
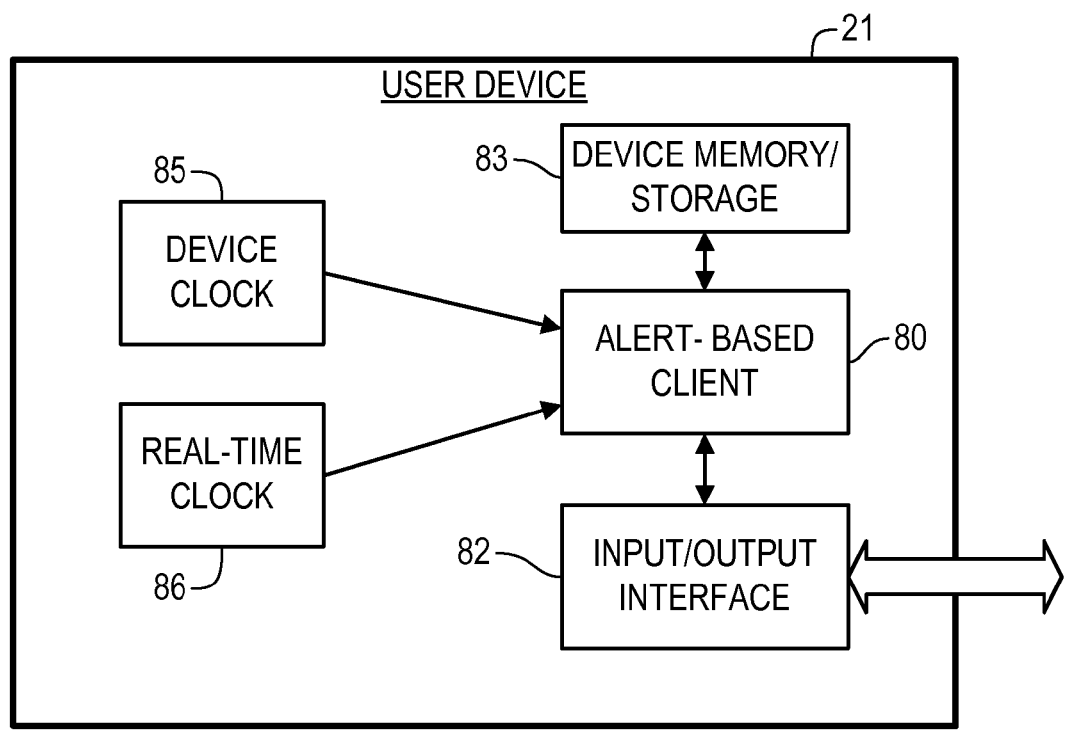
FIG. 3 is a block diagram showing some of the components of a user device according to a representative embodiment of the present invention.

FIG. 3 is a block diagram showing certain portions of an exemplary user device 21 according to a representative embodiment of the present invention. In the present embodiment, user device 21 has installed on it an alert-based client application 80 that performs all or nearly all of the special functionality associated with the present invention. Preferably, application 80 is implemented entirely in software (e.g., as a Java midlet or Brew application), but instead may be implemented in any of the other ways discussed herein.

As shown, application 80 communicates with the input/output interface 82 of the device 21. Depending upon the particular device 21, interface 82 generally will be comprised of hardware and software components for communicating, e.g., across a TCP/IP (Transmission Control Protocol/Internet Protocol) network and/or across a wireless communications channel (e.g., cellular-based, any of the 802.11x family of protocols, Bluetooth, infrared, or the like). Generally speaking, input/output interface 82 provides the primary communication link between client application 80 within device 21 and server 12.

As discussed in more detail below, application 80 stores certain information that it receives via interface 82 into device memory or storage 83 (preferably non-volatile) until an appropriate time, such as the designated delivery time. Application 80 preferably also monitors device clock 85 and real-time clock 86. In this regard, device clock 85 typically is a hardware device that provides timing clock signals for synchronous processing by the various hardware components of device 21 (e.g., including a general-purpose processor executing application 80). On the other hand, real-time clock 86 typically is implemented as a software application and provides the actual time of day, e.g., for reference by the corresponding user 31 and for time-stamping certain data items within device 21.

Figure 4:
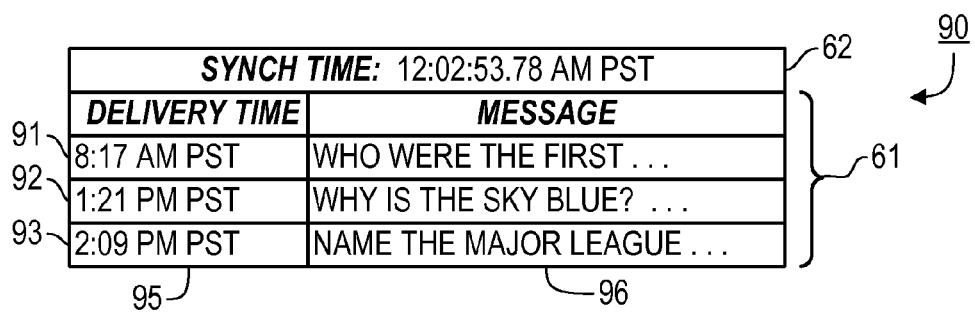
FIG. 4 illustrates an example of alert information and time synchronization information according to a representative embodiment of the present invention.

FIG. 4 illustrates one example of a packet 90 containing alert information 61 and time synchronization information 62 according to a representative embodiment of the present invention. In the present example, synchronization information 62 includes a single timestamp reflecting the current time maintained by server 12 (here, stated to the nearest 0.01 second). The alert information 61 includes a number of entries 91-93, each having a corresponding delivery time 95 and message 96. Although three such entries 91-93 are illustrated, any other number instead may be transmitted at a single time. In addition, although the synchronization information 62 is illustrated as being transmitted in the same packet 90 as the alert information 61, they instead can be transmitted in separate packets. Furthermore, in the present example the messages 96 are questions; however, as discussed in more detail below, any of a variety of different types of messages instead may be included.

Figure 5:
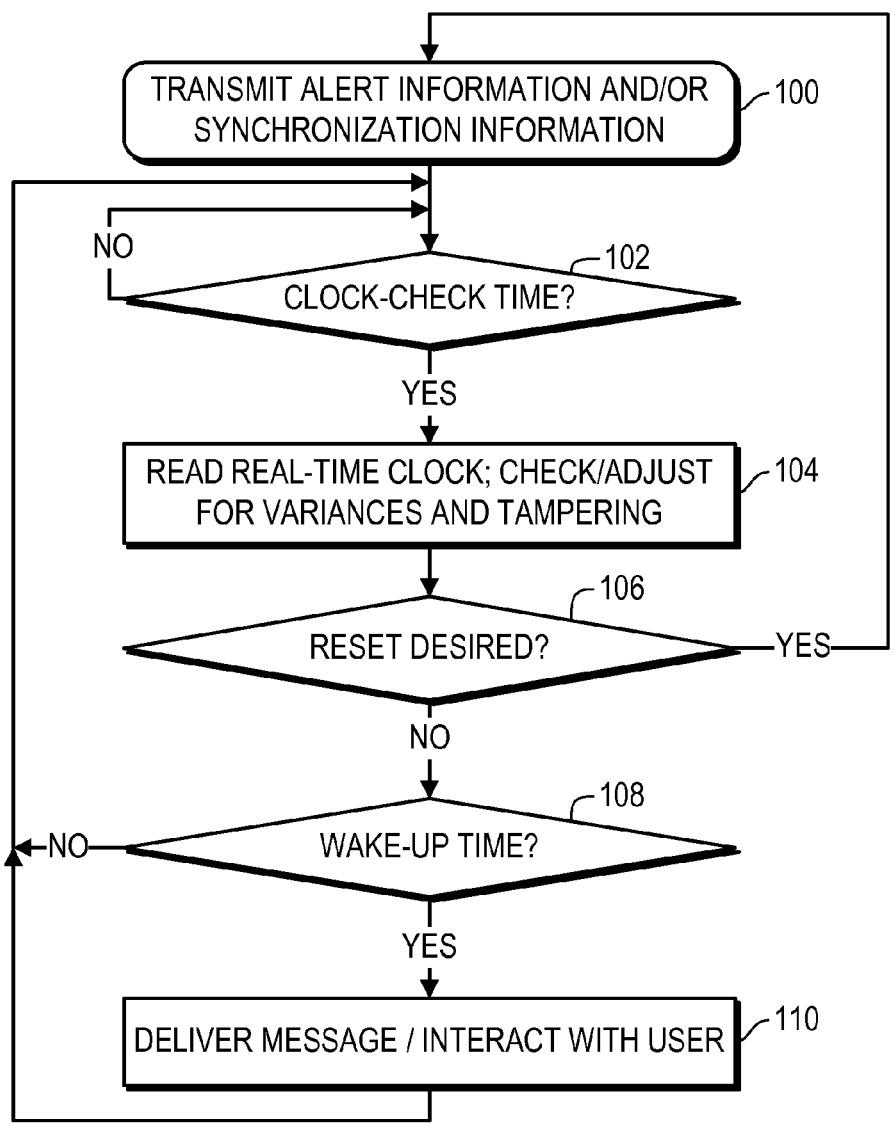
FIG. 5 is a flow diagram illustrating an overview of a process for implementing an alert system according to a representative embodiment of the present invention.

FIG. 5 is a flow diagram illustrating an overview of a process for implementing an alert system according to a representative embodiment of the present invention. This process preferably is implemented entirely in software (with step 100 typically being performed by server 12 and the other steps typically being performed by client application 80), but instead may be implemented in any of the other ways discussed herein. Also, the process generally is discussed in the context of the hardware configurations shown in FIGS. 1-3. However, it should be understood that such references are for convenience and ease of understanding only and therefore are merely exemplary in nature.

Initially, in step 100 the server 12 transmits alert information 61 and time synchronization information 62 to a plurality of user devices 21-26. Preferably, at least the alert information 61 is transmitted in an encrypted format, in order to prevent early discovery by the eventual recipients 31-35. Currently, the preferred encryption technique is AES (Advanced Encryption Standard), but any other secure type of secure encryption can be utilized.

In one embodiment, the alert information 61 and time synchronization information 62 are transmitted to all of the user devices 21-26 simultaneously, or substantially simultaneously. In an alternate embodiment, such information is transmitted to the various user devices 21-26 at different times. The latter approach is particularly preferred if latency times are expected to vary in an amount that exceeds the desired tolerance in terms of how closely in time the individual messages 96 are desired to be delivered. In such a case, the latency differences (e.g., the time differences between when the various devices 21-26 actually receive the synchronization information 62) will translate directly into synchronization inconsistencies among the various devices 21-26. Transmitting at least the synchronization information 62 individually to each user device 21-26 can allow for the latency to that device to be estimated and accommodated to some extent.

If, for example, the transmission latency is variable and may be larger than the desired tolerance, an alternate technique may be employed to estimate the latency between the server 12 and the individual devices 21-26, thereby allowing correction for such latency. Rather than simply transmitting a synchronization time, the server 12 might first send out one or more probe packets to a subject user device 21, with the client application 80 having been configured to automatically transmit a response packet, resulting in a kind of pinging of the subject user device 21. Then, assuming that transmission latency is symmetric, the server 12 need only divide the round-trip latency (or the average round-trip latency if more than one packet was sent) by two and then adjust the transmitted synchronization time 62 (e.g., by simply adding such quantity) in order to compensate for the expected one-way latency.

Alternatively, any other technique may be used to estimate and adjust for expectant latency. Also, in certain cases transmitting the synchronization time 62 separately from the alert information 61 might be useful in reducing latency time, particularly where the alert information is voluminous relative to transmission bandwidth.

The construction of the alert information 61 typically is relatively straightforward. A user or a separate automated process supplies server 12 with one or more messages 96 that are to be distributed to a specified group of user devices 21-26 for delivery at one or more specified delivery times 95. The list of devices 21-26 may be generated by reference to user preference information indicating which devices are intended to be active at the scheduled delivery times. Such alert information 61 may then be delivered (preferably in encrypted form) at any time prior to the earliest specified delivery time 95.

It is noted that step 100 is shown differently than the other process steps illustrated in FIG. 5. This is because step 100 generally can be performed at any time during the overall process, e.g., whenever server 12 has a new alert 61 to be pushed out. In addition, step 100 preferably also as performed upon request either by the server 12 or by the alert-based client 80 running on the user device 21, e.g., in order to check for any clock tampering in an attempt to have the message delivered early.

Thus, step 100 generally stands outside of the normal process flow, although it preferably is initiated from the sleep or background mode (as described below) under normal circumstances. Nevertheless, step 100 preferably is executed as the first step of the present process in order to achieve an initial time synchronization and download of alert information 61.

Next, in step 102 client 80 waits until it is time to check the real-time clock 86. At the outset, it is noted that the present embodiment contemplates a "sleep" or "background" mode in which client 80 performs minimal processing. One of the functions that preferably is performed by client 80 during the sleep mode is to periodically check the real-time clock 86 in order to determine whether it is time to deliver a message and to confirm accuracy. The wait in this step 102 preferably is equal to a fixed number of the clock cycles generated by device clock 85.

In this regard, the counting of clock cycles can be performed in software. Alternatively, to avoid unnecessary processor use, a simple hardware counter can be used, e.g., one which generates an interrupt signal when the desired count has been reached. In the preferred embodiments, client 80 checks a real-time clock 86 approximately every five minutes.

In step 104, client 80 reads the current value of the real-time clock 86 and checks for any variances or potential tampering. For the reasons indicated elsewhere in this disclosure, there often may be significant incentives to learning certain information (e.g., contest questions or financial news) prior to the intended delivery time. Accordingly, the present invention preferably uses a number of measures to detect and correct tampering and normally occurring time discrepancies.

As indicated above, client 80 preferably has access to at least three different time indicators. The first one, the synchronization time 62 provided by server 12 generally will be the most accurate, but the least frequently updated. The second, the set of periodic clock-check signals based on the device clock 85, does not provide absolute time, but provides an indication of time-interval durations. The third, the real-time clock 86 provides the most current indication of absolute time, but that measurement might be out of sync with the clock maintained by server 12 and frequently will correspond to a different time zone. In addition, at least the second and third sources potentially are subject to user manipulation. In order to maintain time-synchronization integrity, in this step 104 client application 80 preferably looks for any anomaly between the three sources, whether manifested as a constant bias, a steady drift or a sudden change.

For example, if the real-time clock 86 indicates a jump in its stated time between two adjacent check signals, and such jump is sufficiently different from the expected time interval (or even a movement backward), then a tamper condition might be declared. Alternatively, if the difference is not too far out of specification, then the condition might be monitored further (e.g., during the next couple of clock checkpoints) to determine whether the real-time clock 86 of the user device 21 is simply running excessively faster or slower than it should be (e.g., outside of a specified tolerance). Of course, such a situation also could be a result of a more subtle attempt to manipulate the time stated by real-time clock 86. In any event, preferably at a minimum each message-delivery time 95 (or, alternatively, an internal clock correction) is adjusted to account for any detected difference.

In step 106, a determination is made as to whether a reset is desired. Such situations can include, e.g., either (i) where the difference between what the real-time clock 86 says and what would be expected by virtue of the periodic check signals based on the device clock 85 is excessive; or (ii) where the applicable tolerances in the device clock 85 and the real-time clock 86 make it difficult to establish which is most representative of the correct time. In addition, or instead, a reset determination can be made arbitrarily, at fixed time intervals, or randomly, in an attempt to identify more elaborate tampering schemes.

If such a determination is made in this step 106, then processing returns to step 100 in order to request a new time synchronization signal 62 (if such on-demand requests are supported in the applicable embodiment) or simply wait for the next scheduled time synchronization signal 62 from server 12 (disabling the applicable user device from the alert system until such synchronization occurs). If a reset is not required (e.g., values are within tolerances and/or a determination otherwise is made that the discrepancies appropriately can be handled by an adjustment), then processing simply proceeds to step 108.

Although not shown in FIG. 5, an affirmative determination of tampering preferably causes client application 80 to notify server 12 and disqualifies the corresponding user from participating in any further system alerts. At the same time, in certain cases the time stated by real-time clock 86 will be significantly different than the actual time without any intentional tampering. Such a condition might occur, for example, where the device 21 has been reset and does not have a connection to its wireless carrier, so its real-time clock 86 might be reset to an arbitrary or default time (e.g., 12:00 p.m.). The logic for declaring a tamper condition preferably checks for and takes into account all such conditions or, at the very least, allows a certain number of unexplained discrepancies before declaring a tamper condition.

In the embodiment discussed above, client application 80 maintains a time offset figure indicating the difference in time between real-time clock 86 and the clock maintained by server 12. Equivalently, application 80 could maintain its own internal real-time clock, e.g., using input from all of the three sources indicated above.

In step 108, a determination is made as to whether it is time for the device 21 to wake up from its sleep mode. An affirmative determination in this regard preferably is made if a message is scheduled to be delivered within a specified amount of time (e.g., within 2-10 seconds) or, in certain cases, prior to the next clock-check signal or within a specified margin after it. If the determination is negative, then processing returns to step 102 to await the next clock-check signal. If positive, then processing proceeds to step 110.

In step 110, any of a variety of different types of processing may be performed. Initially, client application 80 preferably brings forward at least some portion of its user interface (preferably overriding any conflicting user interfaces). Generally speaking, the first goal of the user interface in this instance is to capture the user's attention. Accordingly, it is preferable to include some warning signal indicating that a message is about to be delivered. Such a signal preferably comprises an audio alarm, but also could include vibration or other tactile sensations, or even visual cues. The 2-10 seconds mentioned above in connection with step 108 is intended primarily to accommodate such a warning signal (as well as to make the other preparations required for delivering the message on schedule). It is noted that the warning signal is particularly important, and preferably is somewhat longer, in embodiments where the time that the message is to be delivered is not known in advance.

Ordinarily, the user interface also will include some visual display elements, such as a text message or a logo. However, in certain cases all messages are provided entirely by sound (e.g., using synthesized or sampled speech for devices with a small or nonexistent display), or even entirely by vibration or other tactile sensation (e.g., for the visually impaired).

Also, in certain embodiments of the invention the warning signal is accompanied by an opt-out or opt-in message and corresponding period of time during which the user 31-35 can elect to receive the message or elect not to receive the message (depending upon the selected default setting). An opt-in system generally is preferred, particularly where the users 31-35 are only permitted to receive a limited number of messages, where they are required to pay for each message received and/or where the messages are sensitive and therefore should not be seen by others.

Then, preferably just before the delivery time 95, assuming the user has opted to receive the message 96, the message 96 is decrypted and delivered to the user 31-35. The net effect of multiple user devices 21-26 implementing similar client applications 80 is that all of the users 31-35 will receive the message at substantially the same time. As used herein, the expression, "substantially the same time" and similar expressions with respect to delivery of a message are intended to mean close enough in time such that, ordinarily (e.g., assuming a properly functioning system and no inappropriate tampering), recipients generally will not be significantly advantaged by virtue of having received the message earlier or disadvantaged by receiving the message late. For most embodiments contemplated hereunder, the term will correspond to distribution to all recipients within a time window having a maximum duration of approximately 1-3 seconds.

In addition to simply providing a message 96, certain embodiments of the invention provide functionality for allowing the users 31-35 to respond to the message 96. More preferably, such embodiments display a response interface (e.g., one or more clickable or otherwise selectable buttons, objects that can be dragged and/or a field for entering text) on the same user interface as that on which the message 96 is displayed. Depending upon the particular embodiment, as well as the time-sensitivity of the response, the response information preferably either is immediately transmitted to the server 12 or else is saved into memory/storage 83 (e.g., in encrypted form) for later transmission to server 12.

Upon completion of step 110, processing returns to step 102 in order to begin waiting for the next message delivery.

Although the foregoing technology is discussed within the context of simultaneous delivery of a message to multiple individuals, its use is not so limited. Rather, as should be readily apparent, the foregoing technology also can be used for any time-controlled disclosure of information, even where the recipients are receiving it at different scheduled times. Similarly, the foregoing technology is not limited to disclosures to natural persons; in addition, it can be used, e.g., for time-controlled release of information to an automated process. Exemplary uses in this latter respect include electronic funds transfers and electronic payment systems.

The foregoing discussion concerns a particular technique for substantially simultaneous delivery of a message to a number of geographically dispersed recipients. The following two sections describe systems and methods that use such substantially simultaneous delivery of a message. While the approaches described above for achieving the desired substantially simultaneous delivery presently are preferred, the systems and methods described below also may be implemented using any of a variety of other approaches.

For example, where latency is not a significant factor in relation to the required time frame for delivering a message to the recipients, a direct broadcast of such information can be used. Alternatively, in such situations the message itself can be transmitted in advance (e.g., in encrypted form) and only a release signal broadcast by the server 12 (or any other device) when it is time for delivering the message. Still further, a broadcast message can be used simply to wake up a client application on each of one or more user devices; thereafter, a communication channel is opened between each such user device and the server 12, or even among all (or any subset) of such user devices and/or the server 12.

In an alternate embodiment, a different form of push technology is used. For example, a SMS message can be used to "wake up" each client application 80, with the server 12 then receiving confirmation of receipt of that SMS.

In another embodiment, preprogrammed alerts pop up on the user's device 21-26 (e.g., using the device's timer) and invite the user 31-35 to click a button to retrieve a message. One click opens direct (e.g., HTTP) access to the server 12 to retrieve the desired content.

In a still further embodiment, the subject content is broadcast in real time to all users 31-35. Such users 31-35 then respond via broadband.

Substantially Simultaneous Intermittent Contest.

Figure 6:
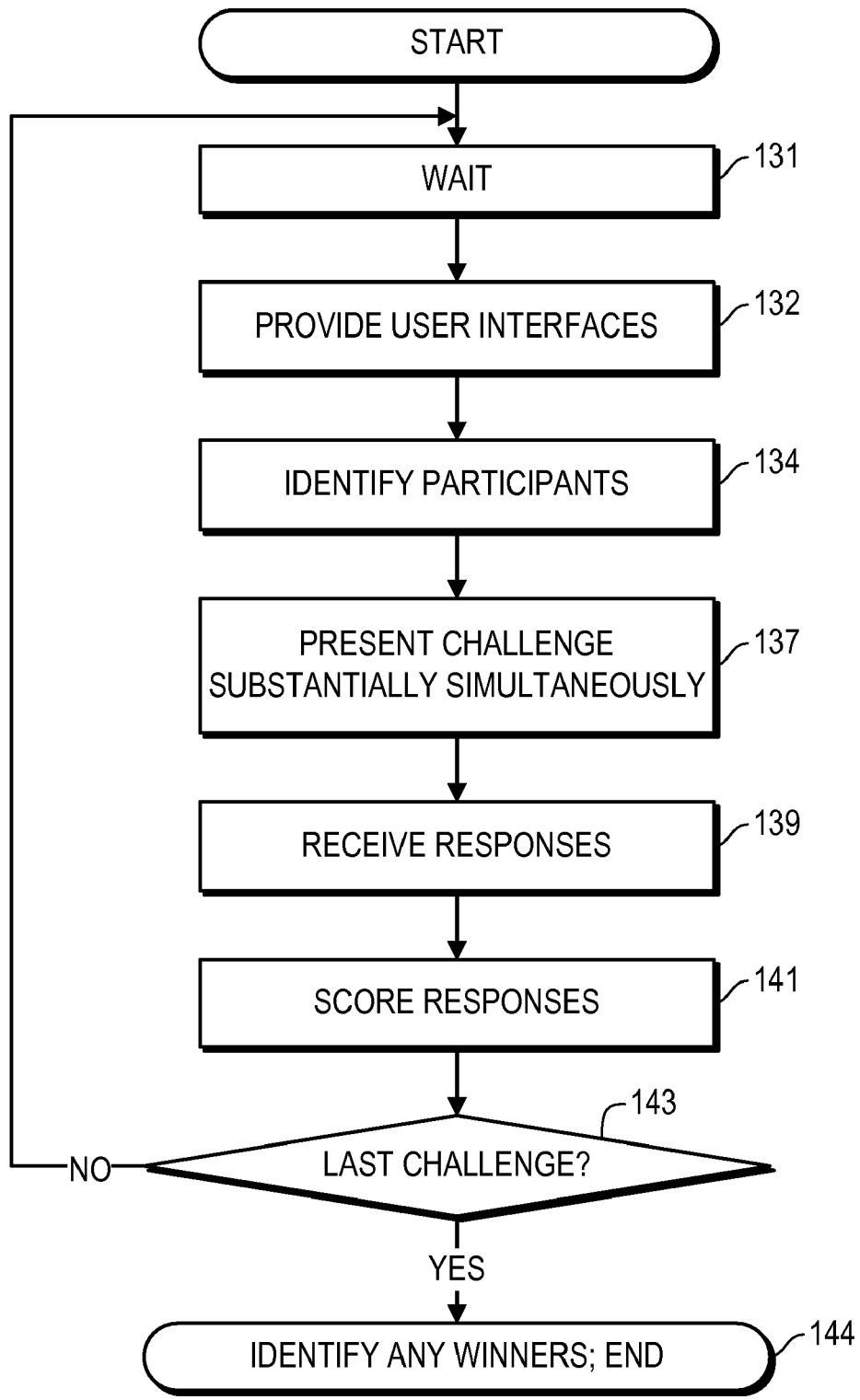
FIG. 6 is a flow diagram illustrating a process for conducting a contest according to a representative embodiment of the present invention.

FIG. 6 is a flow diagram illustrating a process for conducting a contest according to a representative embodiment of the present invention. Generally speaking, the contest according to FIG. 6 is played substantially simultaneously by a number of geographically dispersed players at intermittent points in time. Each player participates by using a (typically network-accessible) device, which may include, e.g., an Internet-accessible computer, a wireless telephone or a wireless personal digital assistant (PDA), as shown in FIG. 1. It is noted that if a technology platform according to the preferred embodiments of the preceding section is used, then it is not necessary for a player's device to be actually connected to a network at the particular moments that active play occurs. Such technology currently is preferred for implementing the present contest, with the contest's problems being the delivered messages, the player devices corresponding to user devices 21-26, and the contest server corresponding to server 12. Accordingly, for ease of explanation, the following discussion assumes such an implementation. However, such references are exemplary only.

Preferably, the contest is played over an extended period of time, such as anywhere from several days to a month, or even longer. As discussed in more detail below, the contest involves a number of problems, which may include multiple-choice or other types of questions. Preferably, each problem is made available to all of the players at substantially the same time, and multiple problems are made available each day of the contest. In order to address the situation that everyone will not necessarily be able to play at the same time, more problems preferably are made available than the number of problems that each player is permitted to respond to, under the rules of the contest.

Initially, upon the beginning of the contest there is a period of waiting 131 for the first problem to be delivered. In the preferred embodiments of the invention, neither the problems nor the times at which they are to be delivered are known to the players in advance. From the players' perspectives, the problems preferably are delivered at random times during the day, or during some specified window of time during the day. When that window occurs preferably depends upon the time zones in which the players are expected to be located. In alternate embodiments of the invention, the particular times, or at least some of the times, when the problems are delivered are known in advance by some or all of the players.

A feature of the present contest is that problems are delivered at intermittent times over an extended period of time. For example, the intervals between problems typically will be at least 30 minutes and often will be 1-2 hours or even longer, thereby contributing to the randomness of the play. More generally, the median time between delivery of problems preferably is at least 30 minutes, 60 minutes or two hours. In addition, the contest typically will go on for at least three days, a week, two weeks, a month or even longer. In the preferred embodiment, each contest is one month long with three or four problems each day (potentially excluding certain weekend days and/or holidays), but with the players allowed to respond to only one problem each day.

In any event, shortly before a problem is scheduled to be delivered, in step 132 a user interface is provided to all of the players via the players' devices. In the preferred embodiments, the user interface preferably includes an alert signal which, in turn, preferably includes an audio component, such as a contest-specific ring tone. It is noted that the exact timing of the alert signal (if provided) generally is not as sensitive as delivery of the actual problem, provided that the various players receive roughly the same amount (or even some minimum amount) of advance warning.

Figure 7:
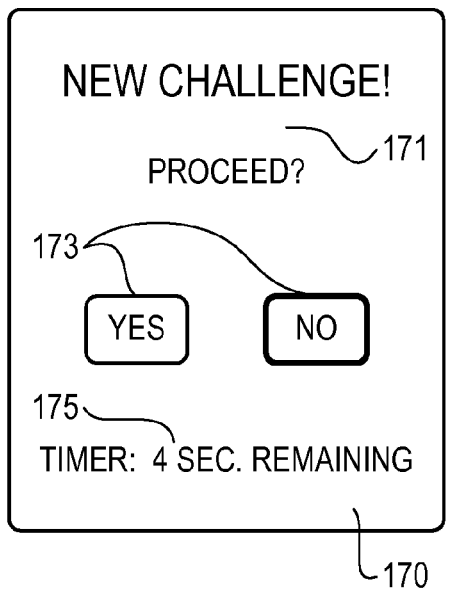
FIG. 7 illustrates an initial user interface questioning whether a player wants to participate in the current problem in a contest according to a representative embodiment of the present invention.

At the same time, the user interface preferably queries whether the player wants to respond to this problem or to pass on it. An exemplary user interface 170 is illustrated in FIG. 7. As shown, interface 170 includes a message 171 notifying the player that a new problem is about to be delivered and asking whether the player wants to participate in the problem. A pair of radio buttons 173 allows the player to designate his or her choice, with a timer 175 indicating the remaining time until the default option (or the currently selected option if the player has highlighted the other option) is selected. In the preferred embodiments, the default (which occurs if no response is given by the player) is to assume that the player is passing on the problem (as indicated in FIG. 7). In a representative embodiment, the timer 175 starts at approximately 4-7 seconds and counts down.

Thus, referring back to FIG. 6, in step 134 the players who will be participating in the present problem are identified (e.g., all of those who have opted to receive the problem). In the preferred embodiments, the players do not get any information about the problem, or at least do not obtain the problem itself, before deciding whether to participate. In alternate embodiments, the players may be given some limited information about the problem along with the alert, such as the general category to which the problem pertains. As a result, in such alternate embodiments the players can decide whether to participate based on factors other than mere convenience (e.g., their comfort level with the general category).

In still further embodiments, the players either do not have any option as to whether they participate, or at least they are not penalized if they respond incorrectly so there is no disincentive to participating. In such embodiments, step 134 generally can be omitted on the assumption that all of the players can be deemed to be participants, irrespective of whether or not they actually do participate. In a variation on this embodiment, step 132 also is omitted, so that the players get no advance warning about when a problem is going to be delivered.

In any event, the set of participants for the current problem preferably exclude the players who already have answered their maximum allotted problems for the current period of time (e.g., their one problem for the day). In this regard, the preferred implementation is for anywhere between 2-8 problems to be presented each day, with each player allowed to answer no more than 1-5 (but preferably always strictly less than the total number of problems presented). More preferably, 3-4 problems are provided each day, with each player allowed to answer not more than 1 of them.

It is noted that the excluded participants also may be excluded from step 132, thereby sparing them an unnecessary alert. Also, in alternate embodiments the problem may be provided to a player at the same time as the participating players even if the subject player already has answered his or her maximum allotted problems or otherwise has opted out; however, this preferably would be for enjoyment purposes only and any response (if permitted) preferably would not count toward the competition. More preferably, however, a problem is not provided to non-participating players until after the problem has been completed by the participating players.

In step 137, the problem is presented substantially simultaneously to all of the participating players. In the present embodiment, participating players are required to answer an ordinary problem (special problems are discussed below) within 30 seconds, or else are scored as getting the problem incorrect. For that reason, and in order to prevent any unfair advantages, the problem preferably is presented within a 3-second window to all or substantially all of the participating players under normal circumstances. Of course, player device failures and other physical limitations at least sometimes will preclude delivery within such a 3-second window to 100% of the player devices.

The problems can involve any type of problem (e.g., knowledge-based or skill-based). However, it presently is anticipated that the most commonly used problem will be a question, typically a multiple-choice question.

Figure 8:
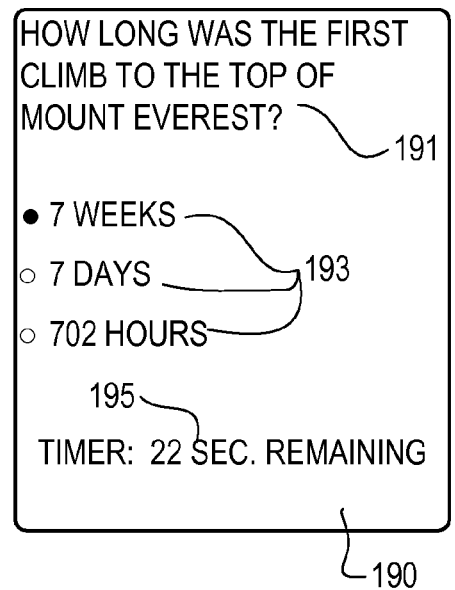
FIG. 8 illustrates a user interface for presenting a problem and accepting a response to it in a contest according to a representative embodiment of the present invention.

An exemplary user interface 190 providing such a problem is illustrated in FIG. 8. As shown, user interface 190 includes a multiple-choice question 191, a plurality of potential answers 193, and a count-down timer 195 which indicates the time remaining in which to provide a response. Because a timer internal to application 80 preferably is used, the participant can be given the full response time (e.g., 30 seconds) from the time that the problem initially is delivered (or displayed), even if there are slight differences (e.g., a second or two) among the various player devices as to when the problem is delivered in absolute time.

The potential answers 193 preferably function as input interface elements (radio buttons in this case), allowing the player to respond directly and quickly within the same user interface 190, by simply designating the desired response 193. Once such a response is designated and then selected (or entered), the problem is over from the current player's perspective.

A number of other types of problems may be provided. For example, rather than a multiple-choice question, the problem could be a question that requires a textual and/or numeric response (e.g., entered through the keypad of a wireless telephone).

Also, irrespective of the form of the expected answer, the question can involve additional media beyond a merely textual question. For example, the participants might be asked to: (i) identify an individual within a photograph or video segment, (ii) identify the next three notes, or the next bar, following a segment of a song that is played for the participants, (iii) count the number of specified items in a particular photograph, or (iv) identify which of three movie-clip-and-soundtrack combinations do not go together. Still further, the problem might be more in the nature of a puzzle or even a video game, requiring onscreen manipulations by the participants.

Still further, the problem might involve external events and/or media outside the four corners of the player's devices 21-26. Preferably, such problems are special problems that are allotted additional time to complete. In one example, the players are directed to find an answer or an item on the Internet. More elaborate problems can involve a sort of virtual scavenger hunt, in which players move from one web site to another searching for the next clue until the answer is found or until time expires.

In any event, in step 139 the answers are received, typically by the individual player devices themselves in the first instance and then either immediately or subsequently transmitted to the contest server (e.g., server 12). As noted below, in certain cases the response time also will be transmitted to the server; in others, the player devices merely indicate whether the response was received within the allotted period of time. In the preferred embodiments, the player devices encrypt the response information before storing it or transmitting it to the contest server.

In step 141, the players' responses are scored. This step can be performed either at the player's device 21-26 itself or, after transmission, by the server 12, with the resulting score simply obtained later (e.g., via the player's device 21-26). In the preferred embodiment, each correct response that was submitted within the required timeframe (e.g., within 30 seconds after the problem was delivered) is awarded a fixed number of points and each incorrect response is assigned a negative point value (e.g., the negative of the point value for a correct response). However, in alternate embodiments different scoring mechanisms are applied. For example, in certain cases no penalty is attributed to an incorrect response. In other cases, the point award for a correct response is a function of how quickly the participant provided the response (in which case the participant's response time preferably is transmitted to the server, if that is where scoring occurs, along with the response itself). In other cases, different point levels are assigned for different levels of performance in connection with the problem (e.g., different point of values for completing 80% of a scavenger hunt and for completing 90% of the same scavenger hunt, within a fixed timeframe).

Next, in step 143 a determination is made as to whether the current problem was the last one for the contest. If not, then processing returns to step 131 to await the next problem. If so, then processing proceeds to step 144.

In step 144, the contest is concluded and the winners (if any) are identified based on total number of points accumulated. In this regard, a contest according to the present invention may be conducted as a tournament with winners (e.g., first, second, third place and/or similar rankings in various subcategories). Alternatively, it may be conducted simply for the sake of accumulating points, e.g., which then are traded for products or services.

In the contests of the present invention, different problems can have different associated point values. For example, the longer, more difficult or otherwise more involved problems preferably have higher point values than the shorter or easier ones. In the preferred embodiments, there are a relatively large number of regular problems (e.g., having a 30-second maximum response time and a standard point value) in just a few higher-value, potentially more involved problems. In certain embodiments, multiple problems (e.g., standard, difficult and extreme, having progressively higher point values) are available at a particular delivery time and the individual players can select which one they want to receive. In such cases, preferably all of the problems are downloaded prior to the delivery time but, for each player, only the selected problem is actually delivered to that player.

Various aspects of the foregoing contest can work together to generate a level of excitement and novelty that do not exist with conventional games or contests. First, as noted above, the contest is not geographically limited (subject, perhaps, to any practical problems that might arise in attempting to conduct the contest across too many time zones). Second, the contest preferably is played substantially simultaneously by all of the participants, so that in a reasonably large crowd several people might receive the alert and begin play, making the present contest more of a social event than typically is the case with conventional games or contests that are played on a personal device. In addition, when the times that the problems are to be delivered are not known in advance, an even heightened level of excitement, spontaneity and social connectedness often can occur.

The foregoing discussion focuses on the actual conduct of the contest. In between active playing times, a significant amount of additional activity can occur. For example, the individual players preferably have the ability to: check their point totals; check rankings or standings; view detailed statistics and even photographs of the leaders; view answers to, and/or strategies for approaching, previous problems; review performance statistics; generate customized reports regarding how individual players performed with respect to specified criteria; browse results from other contests; register for additional contests; and spend the points that they have accumulated. A number of the foregoing items can be particularly important when "powering" is involved, as discussed in the following paragraphs.

In this regard, a significant number of variations on the general contest structure described above are possible. One novel variation is the ability for individual players to "power" with at least one other player. More preferably, each player has the ability to power with one other player, of his or her own choosing, at a time. In such a case, the "powering player" (the one who makes the selection) is awarded points based on the points earned by the player with whom he or she powered (the "leader") and vice versa. Thus, by powering with a very good player, an individual can significantly boost his or her points. Conversely, if a player can get a large number of other players to power with him or her, his or her own point total can be significantly enlarged. As a result, a leader's point total typically will depend not only on how successful he or she is at responding to problems, but also how successful he or she is in attracting others to power with him or her. Preferably, the powering player cannot result in a net loss of points to the leader (even in embodiments in which penalties are assessed against the responding player for incorrect responses), but instead only adds any net point gain earned during the powering relationship. On the other hand, in the preferred embodiments the leader's both positive and negative point earnings preferably also are attributed to the players who have powered with that leader (although in the preferred embodiments, any player's point score can never fall below zero).

In the preferred embodiments, the powering player can also derive other benefits by powering with good leaders. For example, in a tournament contest a powering player preferably is permitted to continue playing so long as the leader remains in the tournament, even if the powering player would not have qualified for continued play by himself or herself.

Figure 9:
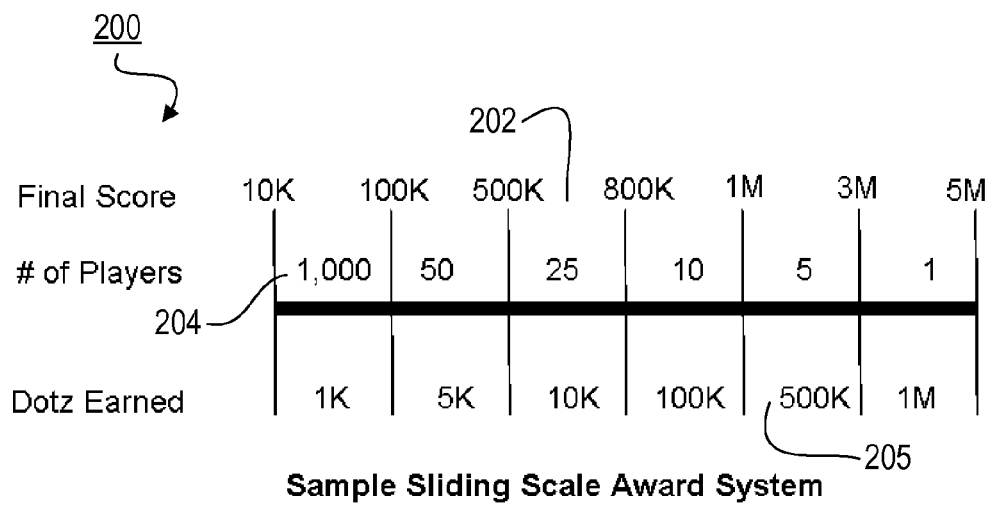
FIG. 9 illustrates a sliding scale for conversion of game points to Dotz according to a representative embodiment of the present invention.

This paragraph describes the particular details of powering according to the preferred embodiment of the present invention. In this embodiment, three different kinds of points are contemplated, referred to as: "Dotz", "PowerUp points" and "game points". At the beginning of each month, in exchange for the monthly fee for participating in the contest, 5,000 Dotz are deposited into each player's account, and any negative balance from the previous month (if permitted) is zeroed out, so that each player has a minimum of 5,000 Dotz. In addition to earning Dotz based on their own performance, each player may power with one other player at a time, essentially binding all of his or her Dotz to that other player for a desired period of time. Irrespective of powering, Dotz are awarded to or subtracted from the player based on the individual player's own correct and incorrect responses and based on the number of Dotz assigned to each individual problem. In addition, if the player has powered, the same number of Dotz is added or subtracted based on the leader's answer to the problem. The player can pull back his or her Dotz from the leader at any time or switch them to another leader, although the player cannot leave and then return to the same leader during a contest. The leader, in turn, receives a number of PowerUp points equal to the total number of Dotz earned by all players who currently are powered with the leader, but does not lose PowerUp points when a powering player answers incorrectly (or at least does not incur a net loss due to any given powering player as a result of the powering relationship; in certain sub-embodiments, PowerUp points contributed by a powering player can later be lost by incorrect responses given by that same powering player). A player can power up his or her Dotz with a leader, but not any PowerUp points that he or she has earned (as a result of other players powering up with him or her). Each player's game score is equal to that player's Dotz plus his or her PowerUp points. At the end of each contest, additional Dotz are awarded to each player on a sliding scale based on overall rank in the contest and/or the absolute number of game points that particular player has, and the total number of Dotz can be exchanged for prizes (e.g., products or services). An example of such a sliding scale 200 is shown in FIG. 9, which includes rows for final game score 202, number of players 204 and Dotz earned 205 based on game score. In the present example, Dotz are earned based on rank: the player with the largest number of game points gets 1,000,000 Dotz, the next five highest get 500,000, the next 10 highest get 100,000, and so on, with the game score cut-offs 202 being determined only upon completion of the contest. In another embodiment, the game score cut-offs 202 are fixed and the number of players who fall within each range varies from contest to contest. Alternatively, any other conversion technique using any combination of overall rank and total number of game points may be used.

The ability to power, as discussed above, often can transform what otherwise would be a solitary or anonymous endeavor into a group or team activity, in which individual players are incentivize to track the performance of, and root for, other players. In the preferred embodiments of the invention, players have flexibility to switch to a different leader (thereby providing incentive to monitor others' performance), but restrictions are applied so that the powering players are forced to carefully consider any such changes. More preferably, during a given contest a player is not allowed to power with the same leader twice, meaning that once a powering player leaves a leader, he or she cannot go back during the same contest.

Variations on the powering concept also are possible. For example, the powering players might receive only a specified percentage (or some other function) of the points earned by the leader and/or vice versa. Alternatively, or in addition, a player might incur a cost for powering (e.g., a loss of 50% of the points he or she otherwise would earn, meaning that it would only make sense to power if one thought that the leader would perform better than the powering player). Still further, in embodiments in which the powering player can in fact harm the leader, the leader preferably has some control over which players power with them.

However, despite the variations, the general concept of powering is that an individual player has the ability to associate with one or more other players for a desired period of time and then flexibly switch associations as desired, potentially benefiting from the successes of the associated players (and in certain embodiments potentially being harmed by the losses of the associated players). Another preferred feature of powering is that individual players have an incentive to attract other players to power with them.

Also, rather than (or in addition to) powering, contests according to the present invention can include flexibly constituted teams. In one such embodiment, the performance of a team as a whole affects the point accumulation of its individual members, for any periods of time that such members are in fact affiliated with the team. While similar in some respects to powering, such a team approach lacks a direct one-to-one relationship between individual players and a leader, instead potentially leading to dynamics in which small ad hoc clusters of individuals are more likely to form.

In either the case of powering or teams, in certain embodiments the contest includes rules regarding the structure of the resulting groups and how individual players within the groups accumulate points. For example, the rules might create a multi-level point-earning structure within each group such that the leader earns the highest percentage, the next level down (perhaps limited to a fixed number of people) the next highest percentage, and so on. Such a structure could lead to intense negotiations about who is assigned to what level, with the risk that any individual player might defect to a different group (or leader) if he or she feels a better deal can be obtained.

In still further embodiments, by also structuring point awards more along group lines, incentives easily can be created for each group to attempt to ensure that each relevant area of knowledge or expertise is adequately covered, or even that each level within the group is adequately diverse in this regard.

The present invention contemplates contests that test the players across wide ranges of knowledge and skill, and as well as special-interest contests, such as contests targeted toward any specific area of interest, knowledge or skill (e.g., sports or entertainment), or any particular demographic (e.g., children, tweens or teens).

As indicated above, the contest can be implemented as a competition with identified winners and potentially bonus points or prizes at the end (typically referred to as a tournament), as a time-limited opportunity to accumulate points which can be exchanged for products or services, or as a combination of both. In one example, at the end of the contest only the individual players having the highest point totals, together with any players who have powered with them, are invited to participate in an elimination tournament, e.g., with the powering players remaining in the tournament as long as their leader does.

For purposes of any tournament elimination or any similar aspect of competition, the rules can be constructed such that at any stage only the player's earned points are considered (excluding any powered points), all of the player's points are considered (including the powered points), or any (e.g., weighted) combination of the two is considered.

Additional Systems and Methods Involving Substantially Simultaneous Delivery.

The technology described above for facilitating simultaneous delivery of messages can be used for other purposes besides contests having simultaneous play. One category of such uses is any situation where simultaneous communication is desired or necessary. While broadcast media traditionally have been used for this purpose in the past, broadcast media are inherently limited in that the audience must have access to the media and be tuned in at the time an announcement is made. Also, broadcast media having low latency variability (such as television or cable broadcasts) generally are not suitable for small-scale releases of information. As noted above, the preferred embodiments of the present invention do not require connectivity at the time a message is delivered, and can permit delivery of a message using a wide range of different devices. Accordingly, a recipient can be more certain that he or she will get an important message at the same time everyone else does. Situations where such substantially simultaneous communications are important include announcement of certain economic and financial news.

Another category of use is where some coordinated activity is desired. As noted above, according to one feature of the present invention, the user devices for all participants wake up or activate at substantially the same time, prompting all such participants into action. This feature can be useful, for example, as an alert that an item being monitored on an on-line auction has just entered the last five minutes of the auction. In such a case, although the initial announcement generally would not require network connectivity, some connectivity typically would be required to actually submit a bid.

An example where coordinated shopping activity can be carried out without any immediate connectivity is where a product or service is made available for sale to the first purchasers. In such a case, using the preferred message delivery technology described above, the initial announcement message is stored in advance on the user's device together with a delivery time. Then, after the message has been delivered, the device stores the response and the response time, transmitting such information back to the server at an appropriate moment.

After the fact, the server can identify the winning purchasers by simply ranking the response times. Note that this embodiment also largely eliminates the latency problems associated with conventional systems for selling out inventory (e.g., concert tickets) over a very short period of time.

Still further applications of the present technology include: sprinkler systems that can be re-programmed remotely; simultaneous opening of locks at banks or other establishments; real-time synchronized traffic light control for efficient traffic flow; updating of electronic billboard content; control of school exams throughout a state or other geographic region; simultaneous adjustment of supermarket pricing at a large number of stores; hotel alarm clocks; simultaneous real-time downloading of prescribed changes in rates to electric meters or other utilities, e.g., giving users a financial incentive to consume during off-peak hours; controlling or timing other aspects of game playing; medication dispensing control (e.g., timing and schedule updating); real-time polling (e.g., Neilson Television Polling) in order to capture instantaneous reactions (e.g., with incentives for the participants to respond immediately) or to track changing reactions over time by capturing reactions at a sequence of points; and in-store promotions (e.g., blasting a promotion to all subscribers to come to the store to purchase any item for a prescribed discount).

Another use of the present technology is in conjunction with broadcast programming. In one such embodiment, content related to a broadcast program (e.g., television or radio show) is downloaded to the user device 21-26 and then is delivered to the corresponding user 31-35 in synchronization with the program. However, the specific messages that are delivered preferably depend upon selections made by the user 31-35 on his or her device 21-26. As a result, an interactive experience can be created without any special-purpose hardware or any connectivity other than the ability to see the broadcast. In one sub-embodiment, even the broadcast has been recorded, with the program recorder/replayer's clock having been synchronized to the clock of the user device, e.g., in the manner described above for user device 25. Note that such embodiments use the present technology for personalized message delivery, rather than substantially simultaneous mass delivery of a common message.

A still further use of this technology is for conducting a real-time audience-participation contest over a broadcast medium. According to one such example, the broadcaster transmits (e.g., broadcasts) a wake-up signal to a number of different user devices 21-26. Substantially simultaneously, the user devices 21-26 wake up and allow their corresponding users to begin playing, preferably at the same time opening up a communication channel with the server 12. It is noted that either or both of the wake-up signal and the problem to be solved may be transmitted in real-time or transmitted in advance and stored on the corresponding devices 21-26, as discussed in detail above. In either event, the wake-up signal may be provided to all eligible players or only to a (e.g., randomly selected) portion of them. In the preferred embodiments, the problem is delivered to all of the audience members (e.g., via television broadcast) at the same time as it is delivered to the participating players, although preferably only the responses of the participating players affect the outcome of the contest. Also, upon waking up, the user devices 21-26 preferably time the user responses locally so as to avoid any communication latency discrepancies among the various user devices 21-26, with the resulting responses and response times being transmitted back to the server 12.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method for implementing a simultaneous, but intermittently played, contest, comprising:
   (a) providing, through a plurality of user devices, each associated with a different player from among a plurality of geographically dispersed players, a user interface that includes an alert signal indicating that a problem is about to be made available, and then shortly thereafter, delivering the problem substantially simultaneously to at least some of said geographically dispersed players through their user devices, the problem being identical for all players;
   (b) receiving responses to the problem from the players and measuring response times corresponding to the responses;
   (c) awarding points to the players based on the responses and corresponding response times; and
   (d) repeating steps (a)-(c) a plurality of times, with a median time interval between delivery of consecutive problems being at least 30 minutes, and with aggregate point totals being maintained for individual players,
   wherein each of said user devices comprises at least one of a personal computer, a wireless telephone or a wireless personal digital assistant.

2. A method according to claim 1, wherein there are at least 100 players.

3. A method according to claim 1, further comprising a step of downloading the problems into the user devices in advance, via a publicly accessible network.

4. A method according to claim 1, wherein the user interface permits the players to decide whether or not to participate in a current problem, and wherein only the players who participate in the current problem are scored with respect to the current problem.

5. A method according to claim 1, further comprising steps of:
   (e) allowing the players to voluntarily associate with at least one other player; and
   (f) while and only while an association exists between a first player and a second player, supplementing the aggregate point total for the first player based on a number of points earned by the second player.

6. A method according to claim 1, wherein the players must answer the problem within a specified period of time after the problem is delivered in order to obtain credit for answering correctly, the specified period of time being not more than 90 seconds.

7. A method according to claim 1, wherein the problems are provided to the players at times that appear random to the players.

8. A method according to claim 1, wherein a correct response to a given problem is awarded a number of points that depends upon how quickly the correct response was submitted after the given problem was delivered.

9. A method according to claim 1, wherein said steps (a)-(c) are repeated on a daily basis over a period of at least 5 days.

10. A method according to claim 1, further comprising steps of:
    (e) allowing each player to choose an other player with whom to form an association and then withdraw the association or change the association to a different player, as desired; and
    (f) while and only while an association exists between a first player and a second player, adjusting the aggregate point total for the first player based on a number of points earned by the second player and adjusting the aggregate point total for the second player based on a number of points earned by the first player.

11. A method according to claim 1, wherein the aggregate point total for each of the players comprises points that can be exchanged for prizes.

12. A method according to claim 1, wherein steps (a)-(c) are repeated over a period of time that is at least one month long.

13. A method according to claim 1, wherein the time interval between problems is at least two hours.

14. A method according to claim 1, wherein at each repetition of steps (a)-(c) the problem is made available to substantially all contest players.

15. A method according to claim 4, wherein more problems are available than the players are permitted to answer, so that the players have flexibility regarding when they participate.

16. A method according to claim 5, wherein the first player has an ability to transfer the association from the second player to a third player, in which case the first player ceases to receive points based on points earned by the second player and begins to receive points that are based on a number of points earned by the third player.

17. A method according to claim 6, wherein the specified period of time is not more than 30 seconds.

18. A system for implementing a simultaneous, but intermittently played, contest, comprising:
   a contest server; and
   a plurality of user devices, each associated with a different player from among a plurality of geographically dispersed players and configured to communicate with the contest server across a network, wherein
   (a) said user devices provide a user interface that includes an alert signal indicating that a problem is about to be made available to said geographically dispersed players, and then shortly thereafter, deliver the problem substantially simultaneously to at least some of said geographically dispersed players, the problem being identical for all players;
   (b) the user devices for said at least some of said geographically dispersed players transmit responses to the problem to the contest server across the network, and then the contest server receives and measures response times corresponding to the responses;
   (c) the contest server awards points to the players based on the responses and corresponding response times; and
   (d) the contest server causes steps (a)-(c) to be repeated a plurality of times, with a median time interval between delivery of consecutive problems being at least 30 minutes, and with aggregate point totals being maintained for individual players,
   wherein each of said user devices comprises at least one of a personal computer, a wireless telephone or a wireless personal digital assistant.

19. A system according to claim 18, wherein there are at least 100 players.

20. A system according to claim 18, wherein the contest server downloads the problems into the user devices in advance, via the network.

21. A system according to claim 18, wherein:
   (e) the players are allowed to voluntarily associate with at least one other player, and
   (f) while, and only while, an association exists between a first player and a second player, the aggregate point total for the first player is supplemented based on a number of points earned by the second player.

22. A system according to claim 18, wherein the problems are provided to the players at times that appear random to the players.

23. A system according to claim 18, wherein the user interface permits the players to decide whether or not to participate in a current problem, and wherein only the players who participate in the current problem are scored with respect to the current problem.

24. A system according to claim 21, wherein the first player has an ability to transfer the association from the second player to a third player, in which case the first player ceases to receive points based on points earned by the second player and begins to receive points that are based on a number of points earned by the third player.

25. A method according to claim 13, wherein the players must answer the problem within a specified period of time after the problem is delivered in order to obtain credit for answering correctly, the specified period of time being not more than 90 seconds.

26. A method according to claim 25, wherein said steps (a)-(c) are repeated on a daily basis over a period of at least 3 days.

27. A method according to claim 25, wherein said steps (a)-(c) are repeated on a daily basis over a period of at least 5 days.

28. A system according to claim 23, wherein more problems are available than the players are permitted to answer, so that the players have flexibility regarding when they participate.

* * * * *